United States Patent [19]

Martin et al.

[11] Patent Number: 5,330,723

[45] Date of Patent: * Jul. 19, 1994

[54] IN-LINE COMPRESSED AIR CARBON MONOXIDE FILTER

[75] Inventors: Charles E. Martin, Hicksville, Ohio; Kenneth W. Overby, Hamilton, Ind.

[73] Assignee: MST, Inc., Hicksville, Ohio

[*] Notice: The portion of the term of this patent subsequent to Sep. 12, 2006 has been disclaimed.

[21] Appl. No.: 902,745

[22] Filed: Jun. 23, 1992

Related U.S. Application Data

[60] Division of Ser. No. 455,450, Nov. 28, 1989, abandoned, which is a continuation-in-part of Ser. No. 56,123, Jun. 1, 1987, Pat. No. 4,865,815.

[51] Int. Cl.$^5$ ............................................. A62B 7/10
[52] U.S. Cl. ..................... 422/122; 55/318; 55/482; 422/120; 422/311
[58] Field of Search .............. 422/120, 122, 170, 176, 422/171, 195, 311; 55/318, 320, 322, 323, 316, 327, 482

[56] References Cited

U.S. PATENT DOCUMENTS

| | | | |
|---|---|---|---|
| 4,089,655 | 5/1978 | Razete | 55/DIG. 17 |
| 4,600,416 | 7/1986 | Mann | 55/323 |
| 4,865,815 | 9/1989 | Martin et al. | 422/120 |

Primary Examiner—Timothy M. McMahon
Attorney, Agent, or Firm—Roger M. Rickert

[57] ABSTRACT

An in-line air purifier (110) for removing contaminants from a compressed air line includes an enclosure (112) having a carrying handle (124), a side wall (116) hinged (118) to a base (114), clasps (120, 122) for releasably closing the side wall (116) onto the base (114), and air inlet (126) and outlet (154, 156) couplers carried on the base (114) for coupling the purifier (110) in a compressed air line. A two stage assembly including replaceable cartridges (40, 42, 90) for removing oil and water, a bed (60) of activated charcoal, and a catalytic bed (76) for carbon monoxide is provided within the base (114) and connected between the inlet (126) and outlet (154, 156) couplers for removing contaminants in compressed air passing therethrough. An air monitor (162) is also provided within the base (114) and connected (157, 158, 160) to the outlet coupler (154, 156) for continuously sampling air passing through the outlet coupler (154, 156). The air monitor (162) includes an indicator (166, 168, 170) for indicating when the concentration of contaminants in air passing through the outlet coupler (154, 156) exceeds a preselected threshold level. The indicator can comprise an audible alarm (168), a light (170), or a digital display (166), or some combination of these.

5 Claims, 2 Drawing Sheets

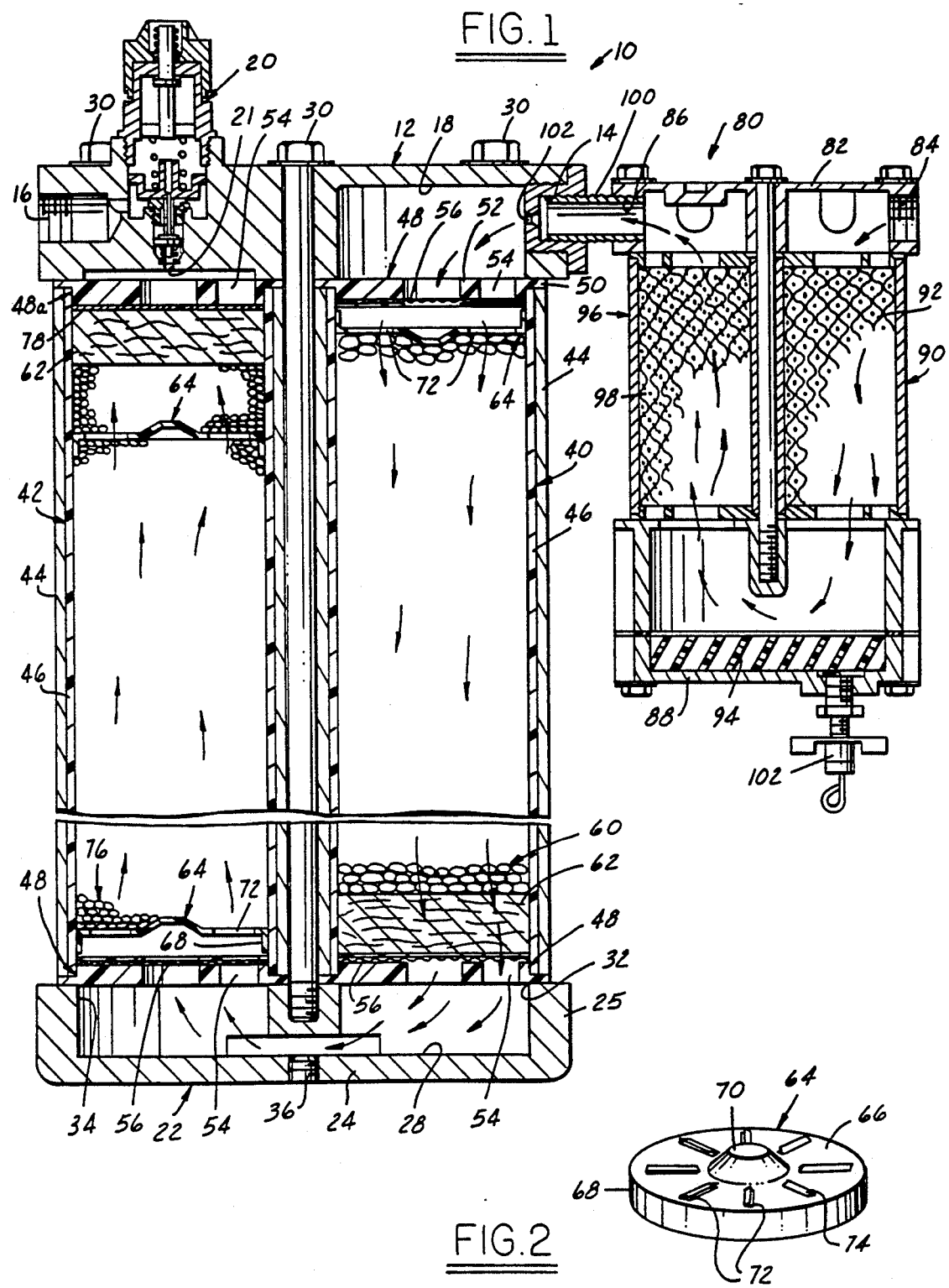

IN-LINE COMPRESSED AIR CARBON MONOXIDE FILTER

This application is a division of copending application Ser. No. 455,450, now abandoned, filed Nov. 28, 1989 which in turn is a continuation-in-part of application Ser. No. 56,123 filed Jun. 1, 1987 and now U.S. Pat. No. 4,865,815.

The present invention is directed to air purifiers, and more particularly to filters for removing oil, water and carbon monoxide from compressed air lines for respirators and like applications.

Persons in an industrial environment using painting or sandblasting equipment, for example, are required by OSHA and CSA regulations to wear protective masks fed by compressed air. There is a problem surrounding oil, water and dust in the compressed air fed to the mask. Moreover, aged or worn air compressors tend to burn lubricating oil and generate carbon monoxide which may be fed, together with unpleasant odors, through the compressed air line toward the mask. OSHA and CSA set allowable standards for contaminants. Prior art attempts to provide the required air purifying apparatus have generally been bulky, expensive, and/or of complex design, making adjustment and replacement of spent components relatively difficult and time consuming.

The Assignee of the present application previously developed an in-line air purifier for removing water, oil and carbon monoxide from a compressed air line which comprises a three-stage assembly mounted on a common air-routing manifold. The first stage includes replaceable cartridges for promoting coalescence of oil and water into droplets for removing such droplets from the air stream. The dried air stream is then routed to a second stage where it is passed through a porous electrically operated heater element. In the third stage, a bed of catalytic pellets is contained within a replaceable cartridge and receives air heated from the second stage for removal of carbon monoxide. A further replaceable cartridge containing a bed of activated charcoal receives the air stream from the catalytic bed for removing odor-causing matter, and the resulting purified air stream is routed through a final drying stage and a manually adjustable pressure regulator to a manifold outlet.

The air purifier just described represents an improvement over the previous art in terms of size, adjustability and ready replacement of the various filter and purifier components. However, further improvements are desirable. In particular, necessity of heating the compressed air to enable reaction with the catalytic material is undesirable. Furthermore, consequent provision of a separate heating stage, including the heating element per se, undesirably adds to the bulk and expense of the purifier assembly.

A general object of the present invention is to provide air purifying apparatus of the described character which is more economical to fabricate and assemble than are similar devices in the prior art, which may be readily adjusted by an operator or user, which efficiently removes water, oil and carbon monoxide from a compressed air stream, and in which the various absorption components are provided in the form of disposable cartridges which may be readily and economically replaced by an operator without substantial downtime and without disassembly of the entire apparatus. A further object of the invention is to provide portable air purifying apparatus which may be readily transported by an operator to and from the job site. Yet another object of the invention is to provide such portable purifying apparatus with integral facility for monitoring air quality and warning a user when air quality falls below desired standards.

BRIEF DESCRIPTION OF THE DRAWINGS

The invention, together with additional objects, features and advantages thereof, will be best understood from the following description, the appended claims and the accompanying drawings in which:

FIG. 1 is an elevational bi-sectional view taken in a vertical plane through a presently preferred embodiment of air purifying apparatus in accordance with the invention;

FIG. 2 is a perspective view of an air baffle employed in the purifying apparatus of FIG. 1;

FIG. 1 illustrates a presently preferred embodiment 10 of an air purifier in accordance with the invention as comprising a manifold 12 having oppositely directed and coaxially aligned internally threaded openings 14, 16 respectively defining an inlet and outlet adapted for in-line connection to a compressed air line. A concave internal surface 18 on manifold 12 internally opposed to inlet opening 14 directs inlet air orthogonally of the inlet axis, or downwardly in the orientation of FIG. 1. A pressure regulator 20 is mounted on manifold 12 and couples a downwardly opening port 21 to outlet 16 for directing upwardly flowing air to the outlet opening. Pressure regulator 20 may be of any suitable construction for permitting a user or operator manually to adjust pressure of compressed air supplied at outlet 16. A hollow base 22 of generally rectangular construction comprises a bottom wall 24 having a peripherally continuous upstanding sidewall 25. Base 22 thus forms a volume 28 suspended beneath and fastened to manifold 12 by the bolts 30. A pair of laterally spaced circular openings 32, 34 are formed in base 22 in respective alignment in assembly with the inlet and outlet of manifold 12. A drainage plug 36 is removably received in base bottom wall 24.

Figure 3:
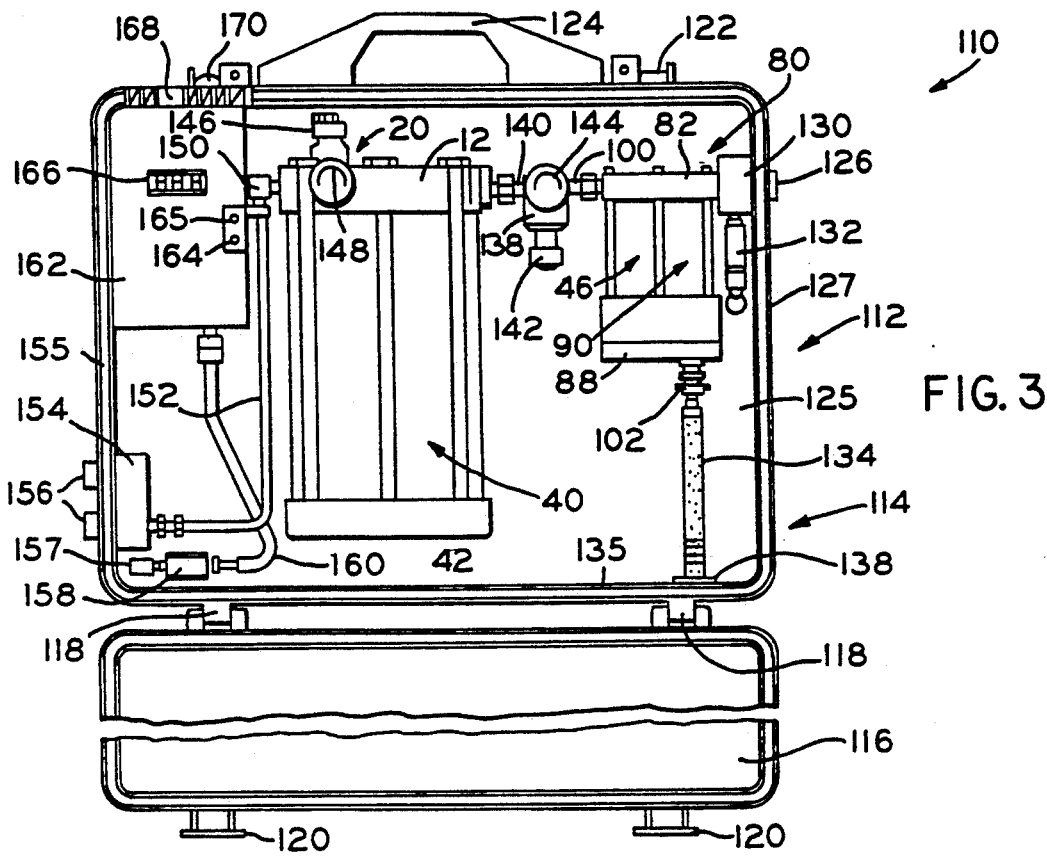
FIG. 3 is a plan view of air purifying apparatus in accordance with another embodiment of the invention.

A pair of spaced parallel cartridge assemblies 40 42 respectively couple inlet 14 to base 22 and base 22 to outlet 16. Cartridge assembly 40 comprises a cylindrical case 46 of imperforate plastic construction. A circular gasket 48 includes a peripheral flange 50 sealingly captured between the upper edge of case 44 in the opposing surface of manifold 12. The central body 52 of gasket 48 includes a plurality of apertures 54 for passing air therethrough. Gasket 48 is preferably of molded plastic composition and has a screen 56 molded therein covering passages 54 for preventing passage of particulate matter therethrough. A gasket 48 of identical construction is positioned at the lower end of cartridge 40 between the edge of case 44 and the opposing surface of base 22. Cartridge case 46 is telescopically received within and surrounded by a cylindrical pressure containment shell 44 of metallic construction.

Internally of cartridge case 46, a bed 60 of activated charcoal fills the internal cartridge volume and extends substantially between the cartridge end walls formed by gaskets 48. Activated charcoal bed 60, which preferably contains charcoal particles in the size range of 10×25 mesh functions to remove odor-causing matter from the air stream passing downwardly therethrough, and also collects various gaseous hydrocarbons such as oil fumes, methane and benzene. A cylindrical block 62 of felt or other suitable filter material is positioned at the lower end of charcoal bed 60 adjacent to gasket 48 for preventing passage of charcoal dust and other particulate matter into the enclosed volume 28 of base 22. Filter block 62 preferably comprises a felt pad 0.80 inches thick and having a weight of 64 oz./yd.$^2$.

At the opposing or upper end of bed 60, between the bed and upper gasket 48, there is positioned within cartridge case 46 an air baffle 64 which is shown in greater detail in FIG. 2. Baffle 64, which is preferably of integral molded plastic construction, comprises a flat circular disc 66 having a peripherally continuous skirt integrally axially projecting therefrom of diameter for sealing engagement with the inside surface of cartridge case 46. A central dimple or crown 70 projects axially of disc 66 in a direction opposite that of skirt 68. A plurality of radially extending rectangular slots or openings 72 extend through disc 66 and are positioned in an angularly spaced circumferential array around the central axis of disc 66. A vane 74 integrally projects from the surface of disc 66 adjacent to one long edge of each opening 72 and is angulated with respect to the disc surface so as to direct air passing through the adjacent disc opening circumferentially of the disc axis. Thus, openings 72 and vanes 74 function collectively to impart a circumferentially swirling motion to air passing therethrough. Furthermore, the baffle insures that air passing therethrough will be uniformly spread over the volume occupied by charcoal bed 60, rather than centrally or otherwise channeled through a limited portion of the bed. Crown 70 prevents charcoal particles from occupying what would generally be a dead air space immediately adjacent to the disc center.

Cartridge 42 includes a cylindrical case 46 of imperforate plastic composition surrounded by a telescoping metallic pressure shell 44. A lower gasket 48 sealingly couples the cartridge case and shell to base 22. At the upper end of cartridge assembly 42, a gasket 48a, identical to gasket 48 hereinabove described in detail but without an integral screen 56, sealingly couples cartridge 42 to manifold 12 coaxially with outlet port 21 and pressure regulator 20. Within cartridge 42, a bed 76 of catalytic particles or pellets fills the internal volume within case 46 and extends substantially between the cartridge end walls formed by gaskets 48, 48a. Individual pellets of catalytic bed 46 are preferably of alumina impregnated with heavy metals (proprietary mixture) composition and have a particle size in the range of ⅛ diameter. In a working embodiment of the invention, the catalytic material is purchased from Teledyne Corp. as Catalog Part No. LTC-95. This catalytic material has the distinct advantage of being functional at room temperature, and thus does not require preheating of air passing therethrough for conversion of carbon monoxide to carbon dioxide. Catalytic bed 76 also converts or absorbs ozone, nitric oxide, sulphur dioxide, nitrogen dioxide, hydrogen sulfide, ammonia acetaldehyde, methyl chloride, methyl ethyl ketone, acetone and methyl alcohol.

A block 62 of filter material is captured between the upper end of catalytic bed 76 and gasket 48a, and a disc 78 of paper or other suitable filter material is sandwiched between filter pad 62 and gasket 48a. Filter disc 78 is preferably of 1 μ filtering capability mesh. Thus, filter pad 62 and disc 78 cooperate in preventing passage of catalytic dust and other particulate material to the purifier outlet. A baffle 64 is positioned within cartridge 42 adjacent to base 22. Most preferably, at least one additional baffle 64 is captured within the catalytic bed itself to promote additional swirling action in air passing through the catalytic bed for enhanced reaction with the catalytic pellets and for additionally preventing channeling of air through a restricted portion of the catalytic bed.

Cartridges 40, 42 are of readily replaceable construction. More specifically, cartridge 40 is preferably supplied with lower gasket 48 and baffle 64 ultrasonically welded or otherwise permanently secured to case 46, pad 62 and bed 60 being captured therebetween, and with upper gasket 48 separate. Likewise, cartridge 42 is supplied with upper gasket 48a and lower baffle 64 affixed to case 46, bed 76, intermediate baffle 64, pad 62 and paper disc 78 being captured therebetween, and with lower gasket 48 separate. In the field, when one or both cartridges 40, 42 require replacement, bolts 30 are loosened with two (2) corner bolts removed and the corresponding cartridge and pressure shell are laterally removed. The used separate gasket is removed and discarded, and the used cartridge case subassembly is telescopically withdrawn from its pressure shell 44 and discarded. The new cartridge case subassembly is telescopically inserted, the new separate gasket placed in the opposing end, the assembly then reinserted between manifold 12 and base 22, and bolts 30 are replaced and tightened.

An air line vapor trap 80 for removing water and/or oil vapor from the compressed air stream includes a manifold 82 having spaced coaxial inlet and outlet openings 84, 86, and a hollow base 88 suspended beneath manifold 82. A first cartridge assembly 90 extends between the manifold inlet and the enclosed volume within base 88, and contains a wire pad 92 adapted to promote coalescence of water and/or oil vapors in air passing therethrough into droplets which are then entrained by the air and carried into the base volume. An integral honeycomb structure 94 cooperates with the bottom wall and sidewalls of base 88 to form a dead air space which captures water and oil droplets falling from air entering the enclosed volume from cartridge 90. Since the construction of honeycomb structure 94 prevents substantial air movement therewithin, revaporization is substantially eliminated. In the meantime, the compressed air stream, which is now 75% to 95% dry, is fed from the enclosed volume within base 88 into cartridge 96. As air passes upwardly through fiber/mesh plug 98, any remaining water droplets are re-evaporated. A drain 102 within base 88 may be activated as desired to remove liquid from the lower portion of base 88. A trap of this type is disclosed in U.S. Pat. No. 4,600,416.

The dry air output of vapor trap 80 is fed by a fitting 100 and an orifice 102 to inlet 14 of the air purifier stage. Orifice 102 reduces pressure at the air purifier inlet, and consequently also reduces effective humidity. The dry air is directed downwardly by manifold 12 through baffle 64 and into charcoal bed 60 wherein unpleasant odor-causing matter is removed. Following additional filtration at pad 62, air enters volume 28 within base 25 and flows upwardly through catalytic bed 76 wherein any carbon monoxide is removed in accordance with well-known principles by conversion to carbon dioxide. Following passage through filter pad 62 and filter disc 78, air from which water and oil vapors, odor-causing materials and carbon monoxide have been thus removed is fed through port 21 to purifier outlet 16 at a pressure controlled by regulator 20.

FIG. 3 illustrates a modified embodiment 110 of air purifying apparatus in accordance with the invention contained within a transportable case 112. Case 112, which is preferable of light-weight molded plastic construction, has a hollow rectangular base 114 to which a cover 116 is fastened by the hinges 118 to pivot between an open position (FIG. 3) and a closed position in which clasps 120 on the hinge-remote edge of cover 116 resiliently releasably engage dogs 122 on base 114. A handle 124 projects from the hinge-remote side of base 114. Internally of case 112, vapor trap 80 is mounted to the back wall 125 of base 114 to receive air through an inlet fitting 126 which externally projects from the adjacent sidewall 127 of base 114. A pressure relief valve 132 is mounted to a port block 130 between fitting 126 and vapor trap 80 to limit inlet air pressure to trap 80. Drain 102 is coupled by a hose 134 to a drain 136 carried by the bottom wall 135 base 114 for draining liquid from purifier 110.

Vapor trap outlet fitting 100 is connected by a pressure regulator 138 and a second fitting 140 to the inlet of purifier manifold 12. Regulator 130 has an adjustment knob 142 and a pressure indicator dial 144. Likewise, regulator 20 at the outlet of purifier manifold 12 has an adjustment knob 146 and a pressure indicator dial 148. The outlet of manifold 12 is connected by a fitting 150 and a tube 152 to an outlet port block 154 mounted to the lower edge of base sidewall 155. A pair of hose couplings 156 are mounted externally of sidewall 155 and coupled to block 154. Port block 154 also feeds a portion of purifier outlet air through a fitting 157, a valve 158 and a tube 160 to the inlet of an air monitor 162. Monitor 162 preferably comprises a battery-operated CO monitor of any suitable type having an on/off switch 164, an alarm test switch 165 and an LCD readout 166 for indicating contaminant concentration. Monitor 162 is preadjusted, either at the factory as in the field, to detect a contaminant concentration not greater than applicable standards or regulations, and to provide a warning to an operator through an audible alarm and a grate 168 in the top wall 169 of base 114, and also by flashing a warning lamp 170. Monitor 162, manifold 12 and trap 80 are mounted by suitable brackets (not shown) within base 114.

Figure 4:
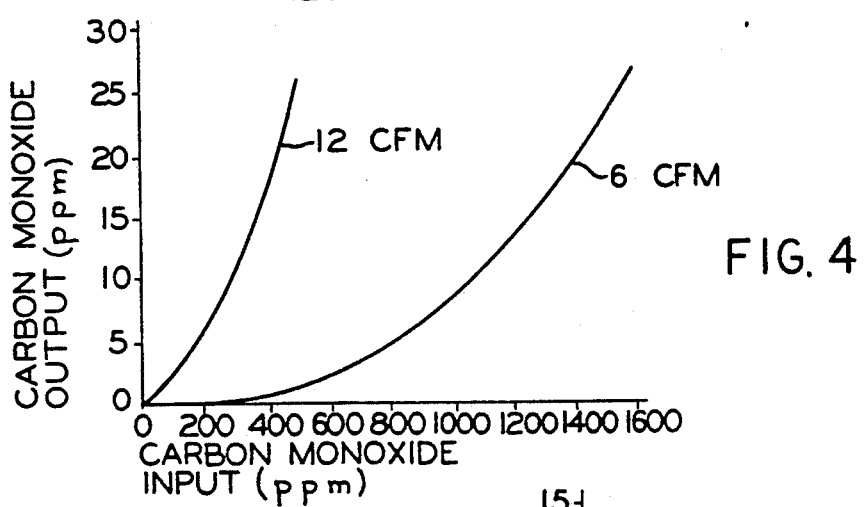
FIGS. 4–5 are graphic illustrations of the embodiment of FIG. 3 in operation.
Figure 5:
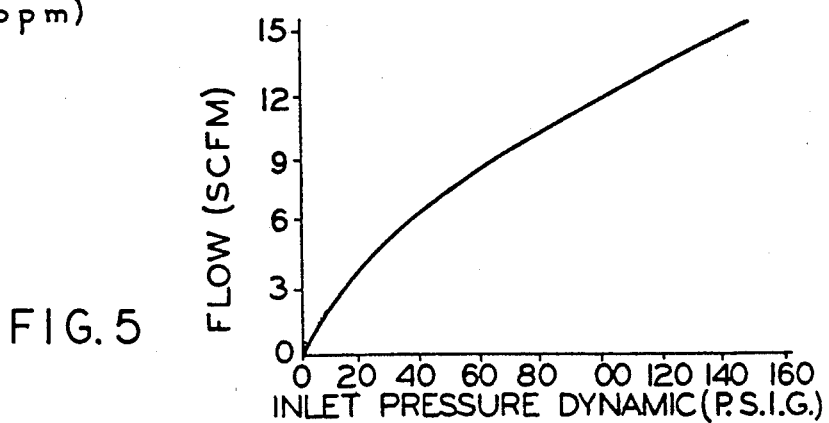

The invention thus provides an air purifier for removing oil, water, dirt, rust, scale and carbon monoxide from a compressed air line, contained within a rugged portable suitcase-like enclosure. Regulator 138 adjusts input air pressure to the purifier stage, while regulator 20 adjusts final air pressure to the operator's mask or hood. Valve 158 is factory set to feed only the correct flow of air to monitor 162—e.g., in the range of 200 to 500 ccpm. Monitor 162 thereby continuously samples output air, displays carbon monoxide contaminant concentration at LCD 166, and both audibly and visually warns an operator if such concentration exceeds the preset thresholds. If such occurs, cartridge 42 may be replaced and/or air flow rate may be reduced. FIG. 4 graphically illustrates carbon monoxide input and output concentrations for a working embodiment of purifier 110 (FIG. 3) at air flow rates of 6 and 12 SCFM, and FIG. 5 illustrates flow rate versus dynamic p-assure at inlet block 130. In a working embodiment of the invention, monitor 162 comprises an OTOX 2003 monitor marketed by Neotronics Ltd. of Herts, England. This unit includes both audible and visual alarms as described, as well as circuitry for detecting and displaying up to 1000 ppm CO concentration at display 166. Zero and span adjustments may be made in the field.

The invention claimed is:

1. A filter for removing carbon monoxide from a compressed air line comprising:

housing means including a manifold and enclosure means, the manifold including means defining an inlet and an outlet, and means between said inlet and outlet for directing air downwardly from said inlet and receiving air directed upwardly toward said outlet, the enclosure means defining an enclosed volume suspended beneath and spaced from said manifold, first means mounted and extending between said inlet and said enclosure means for directing incoming air downwardly into said enclosed volume, and second means mounted and extending between said enclosure means and said outlet for directing air from said enclosure means to said outlet, each of said first and second means comprising cartridge means having an imperforate sidewall and open end walls for receiving and passing air to and from said manifold and said enclosure means, one of said first and second means comprising a bed of activated charcoal within the associated sidewall extending substantially between said end walls, and the other of said first and second means comprising a bed of catalytic pellets within the associated sidewall extending substantially between said end walls for removing carbon monoxide in air passing therethrough, each said cartridge means comprising filter means adjacent to one said end wall for preventing passage of dust and particulate matter therethrough, and baffle means adjacent to the opposing end wall for directing incoming air along the adjacent sidewall, said baffle means in said first means being positioned adjacent to said manifold and said baffle means in said second means being positioned adjacent to said enclosure means, third baffle means positioned within said bed of catalytic pellets for directing air passing therethrough internally along the associated said sidewall, all of said baffle means being of identical construction and comprising a disc having a periphery in sealing engagement with the associated sidewall and a circular array of passage means through said disc adjacent to said periphery, said discs being of circular peripheral contour, and wherein said passage means comprises a plurality of angularly spaced rectangular slots extending radially of said disc, said each said baffle means further comprises a plurality of vanes integrally projecting from said disc, one adjacent to a circumferential edge of each said slot and being angled with respect thereto for directing air passing through said slots circumferentially of said disc.

2. The filter set forth in claim 1 further comprising pressure regulator means at said outlet for regulating air pressure at said outlet.

3. The filter set forth in claim 2 further comprising an oil and water trap removably coupled to said inlet for removing oil and water from air passing therethrough to said inlet to said catalytic and charcoal beds.

4. The filter set forth in claim 1 wherein each of said first and second means comprises a cartridge assembly removably captured between said manifold and said enclosure means.

5. The filter set forth in claim 4 wherein said cartridge assembly comprises a cylindrical case of plastic construction enclosing the associated said bed, baffle means and filter means, a pressure containment shell of metallic construction telescopically surrounding said case, and a pair of gaskets sealingly coupling said cartridge assembly to said manifold and said enclosure means.

* * * * *